United States Patent
Ahmed et al.

(10) Patent No.: US 11,347,859 B2
(45) Date of Patent: May 31, 2022

(54) SYSTEMS AND METHODS FOR LEVERAGING AUTHENTICATION FOR CROSS OPERATING SYSTEM SINGLE SIGN ON (SSO) CAPABILITIES

(71) Applicant: DELL PRODUCTS L.P., Round Rock, TX (US)

(72) Inventors: Minhaj Ahmed, Allen, TX (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 16/529,317

(22) Filed: Aug. 1, 2019

(65) Prior Publication Data
US 2021/0034748 A1 Feb. 4, 2021

(51) Int. Cl.
| | | |
|---|---|---|
| G06F 7/04 | (2006.01) |
| G06F 21/30 | (2013.01) |
| G06F 21/41 | (2013.01) |
| G06F 21/33 | (2013.01) |
| G06F 21/57 | (2013.01) |

(52) U.S. Cl.
CPC .......... *G06F 21/572* (2013.01); *G06F 21/335* (2013.01); *G06F 21/41* (2013.01); *G06F 21/575* (2013.01)

(58) Field of Classification Search
CPC ..... H04L 63/0815; H04L 63/10; H04L 63/08; H04L 9/3234; G06F 21/41; G06F 21/44; G06F 21/335; G06F 21/62; G06F 21/572; G06F 21/575; H04W 12/068; H04W 12/062
See application file for complete search history.

(56) References Cited

U.S. PATENT DOCUMENTS

| | | | | |
|---|---|---|---|---|
| 8,001,586 B2* | 8/2011 | Zhang | ............. | G06Q 20/206 |
| | | | | 726/8 |
| 8,001,587 B2* | 8/2011 | Lovat | ............. | H04N 1/00352 |
| | | | | 726/8 |

(Continued)

OTHER PUBLICATIONS

H. Nair and R. Sridaran, "An Innovative Model (HS) to Enhance the Security in Windows Operating System—A Case Study," 2019 6th International Conference on Computing for Sustainable Global Development (INDIACom), New Delhi, India, 2019, pp. 1207-1211. (Year: 2019).*

(Continued)

*Primary Examiner* — Michael Simitoski
(74) *Attorney, Agent, or Firm* — Egan, Enders & Huston LLP

(57) ABSTRACT

Systems and methods are provided that may be implemented during a pre-boot environment to authenticate a user in the basic input/output system (BIOS) of an information handling system, and to securely provision a resulting authentication token to post-boot operating system (OS) login components of the system. In addition, single sign-on user authentication may be performed during a pre-boot BIOS environment and then extended to the post-boot OS environment without requiring exchange of pins or other intermediary authentication factors between the OS and pre-boot authentication (PBA) for the user to gain access to the information handling system or other network resources.

22 Claims, 4 Drawing Sheets

(56) References Cited

U.S. PATENT DOCUMENTS

| | | | | |
|---|---|---|---|---|
| 8,850,543 B2* | 9/2014 | Von Bokern | ............ | G06F 21/44 |
| | | | | 726/7 |
| 8,955,075 B2* | 2/2015 | Von Bokern | .......... | H04L 9/3226 |
| | | | | 726/7 |
| 10,432,616 B2* | 10/2019 | Von Bokern | ............ | H04L 63/20 |
| 10,855,674 B1* | 12/2020 | Geusz | ..................... | H04L 63/20 |
| 2008/0077986 A1* | 3/2008 | Rivera | ................... | G06F 21/34 |
| | | | | 726/20 |
| 2008/0083019 A1* | 4/2008 | Wang | ................... | G06F 21/575 |
| | | | | 726/5 |
| 2008/0263363 A1* | 10/2008 | Jueneman | ............ | H04L 63/061 |
| | | | | 713/184 |
| 2009/0165097 A1* | 6/2009 | Cherian | .................. | H04L 67/34 |
| | | | | 726/5 |
| 2009/0249434 A1* | 10/2009 | Challener | ................. | G06F 1/24 |
| | | | | 726/1 |
| 2009/0319806 A1* | 12/2009 | Smith | .................. | G06F 21/575 |
| | | | | 713/193 |
| 2010/0169640 A1* | 7/2010 | Smith | ................ | H04L 63/0815 |
| | | | | 713/155 |
| 2011/0138166 A1* | 6/2011 | Peszek | .................. | G06F 21/575 |
| | | | | 713/2 |
| 2012/0151223 A1* | 6/2012 | Conde Marques | ......................... | |
| | | | | G06F 21/6218 |
| | | | | 713/193 |
| 2015/0095638 A1* | 4/2015 | Smith | ................. | H04L 63/0815 |
| | | | | 713/155 |
| 2017/0091438 A1* | 3/2017 | Raziel | .................... | G06F 21/575 |
| 2017/0140151 A1* | 5/2017 | Nelson | ................. | H04L 9/3234 |
| 2017/0147801 A1* | 5/2017 | Hamlin | ................. | G06F 21/575 |
| 2020/0169549 A1* | 5/2020 | Smith | ................... | H04W 12/06 |

OTHER PUBLICATIONS

Microsoft Docs, "Credentials Processes in Windows Authentication", Oct. 2016, 20 pgs.
Wikipedia, "Kerberos (protocol)", Printed from Internet Jul. 6, 2019, 7 pgs.
Microsoft Docs, "Kerberos Authentication Overview" Oct. 2016, 3 pgs.
Rouse, "Kerberos", SearchSecurity.com, Aug. 31, 2016, 2 pgs.
Wikipedia, Shim (computing), Printed from Internet Jul. 6, 2019, 2 pgs.
Microsoft Docs, "Windows Logon Scenarios", Oct. 2016, 7 pgs.

* cited by examiner

SYSTEMS AND METHODS FOR LEVERAGING AUTHENTICATION FOR CROSS OPERATING SYSTEM SINGLE SIGN ON (SSO) CAPABILITIES

FIELD

This invention relates generally to information handling systems, and more particularly, to operating system (OS) single sign on (SSO) authentication.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

User authentication (password, fingerprint, facial recognition) is typically required to allow a user to logon to a booted operating system (OS) such as Microsoft Windows. In the case of Microsoft Windows, the OS maintains tokens obtained as a result of this post-boot Windows OS user authentication in a local cache. Every time the user accesses a new resource that has not already been authenticated for, the Windows OS retrieves these tokens and uses them automatically to authenticate the user to the new resource.

Network and Windows server Active Directory (AD) aware pre-boot authentication (PBA) solutions perform information handling system (server) authentication in the PBA operating environment, and then upon Windows OS session loading, the PBA server provides the OS application with passing candidate credentials to the OS. Providing conventional pre-boot authentication for an information handling system executing the Microsoft Windows OS means that a system user is first authenticated in the basic input/output system (BIOS) prior to booting the OS, and is then single-signed onto the Windows OS.

In many cases, the information handling system may be coupled across a network to additional resources (such as a print server, media server, file share server, etc.) that require user re-authentication to use these additional resources. Thus, once single-signed onto the Windows OS of the information handling system, the user may then attempt to access these additional network-coupled resources. However, since the user was single-signed onto the Windows OS from BIOS pre-boot authentication, no post-boot user authentication previously took place in the Windows OS itself. Consequently, the system user needs to be again presented with authentication options so that their credentials can be obtained from the user to allow access to the additional network-coupled resources.

SUMMARY

Disclosed herein are systems and methods that may be implemented during a pre-boot environment to authenticate a user in the basic input/output system (BIOS) of an information handling system, and to securely provision a resulting authentication token to post-boot operating system (OS) login components of the system. In one embodiment, the disclosed systems and methods may be implemented during pre-boot to allow BIOS to authenticate a human user against a Microsoft server Active Directory (AD) in pre-boot, and through the same process as used by post-boot OS login components. In one embodiment, single sign-on user authentication may be performed during a pre-boot BIOS environment and then extended to the post-boot OS environment without requiring exchange of pins or other intermediary authentication factors between the OS and pre-boot authentication (PBA) for the user to gain access to the information handling system or other network resources such as services.

In one embodiment the disclosed systems and methods may be implemented to enable single sign on (SSO) into the operating system (OS) of an information handling system with an authentication token (e.g., Kerberos ticket-granting ticket "TGT") obtained from a Kerberos server at boot time (prior to OS booting), and without any need for further processing. In such an embodiment, Kerberos specific tokens may be inserted into OS cache at boot-time (prior to OS booting), thus affording the same behavior as is achieved when a human user logs in directly at an OS login screen. In one embodiment, generic application programming interface/s (APIs) may be used to enable a stable single communication point between upper level OS authentication services (e.g., such as System Mode Credential Provider) and lower level modules (e.g., such as Drive filter drivers) to enable Kerberos tokens obtained in a pre-boot PBA environment to be inserted into the OS cache. In a further embodiment, an OS shim may be employed to provide needed abstraction to upper level OS authentication services from the lower level modules.

In one embodiment, the disclosed systems and methods may be implemented to enable authentication in information handling system BIOS and securely provisioning authentication to operating system (OS) login components with no negative performance impact to network exchange either during the OS boot or during user access to a network resource requiring authentication. In a further embodiment, network traffic may be reduced by eliminating the need for authenticating every user twice.

In one embodiment, the disclosed systems and methods may be implemented to provide a secured method to obtain and relay a ticket-granting ticket (TGT) from a Kerberos server a single time during boot procedure, e.g., to eliminate false attack detection triggers. In this regard, significant security optimization may be provided using a Kerberos TGT token that is timestamped and not repayable (i.e., as compared to candidate credentials which can be replayed), and that limits repetitive authentication events against Microsoft server Active Directory (AD) by a single user which is identified as a potential attack characteristic.

Thus, the disclosed systems and methods may be implemented in one exemplary embodiment in a way that eliminates two major attack indicators (i.e., multiple login attempts from the same client and passing candidate credentials from one operating environment to another—PBA to OS). In addition, since the passing of the Kerberos TGT is bound by time and client endpoint, there is security inherently provided to ensure replay and export attacks are not successful. Moreover, the ability to leverage a Kerberos TGT from one operating boundary into a secondary operating boundary may also be provided, together with elimination of the requirement for user presented credential transference between operating boundaries to provide challenge authentication attempts.

In one respect, disclosed herein is a method, including: operating a client information handling system in a pre-boot environment before any operating system (OS) is booted to authenticate a local user of the client information handling system across a network with a first remote network device, and to store an authentication token received across the network in the client information handling system from the first remote network device in response to the authentication of the local user; and then booting an OS on the client information handling system without re-authenticating the local user to retrieve and provide the stored authentication token across the network from the client information handling system to at least one network service device to obtain access to one or more services of the network service device.

In another respect, disclosed herein is an information handling system, including: at least one programmable integrated circuit; and non-volatile system storage coupled to the programmable integrated circuit, the system storage including one or more non-volatile storage devices. The programmable integrated circuit may be programmed to: operate in a pre-boot environment before any operating system (OS) is booted to authenticate a local user of the information handling system across a network with a first remote network device, then store in the system storage an authentication token received across the network in the information handling system from the first remote network device in response to the authentication of the local user, then boot an OS on the information handling system without re-authenticating the local user to retrieve the stored authentication token from the system storage, and then provide the stored authentication token across the network from the information handling system to at least one network service device to obtain access to one or more services of the network service device.

DESCRIPTION OF ILLUSTRATIVE EMBODIMENTS

Figure 1:
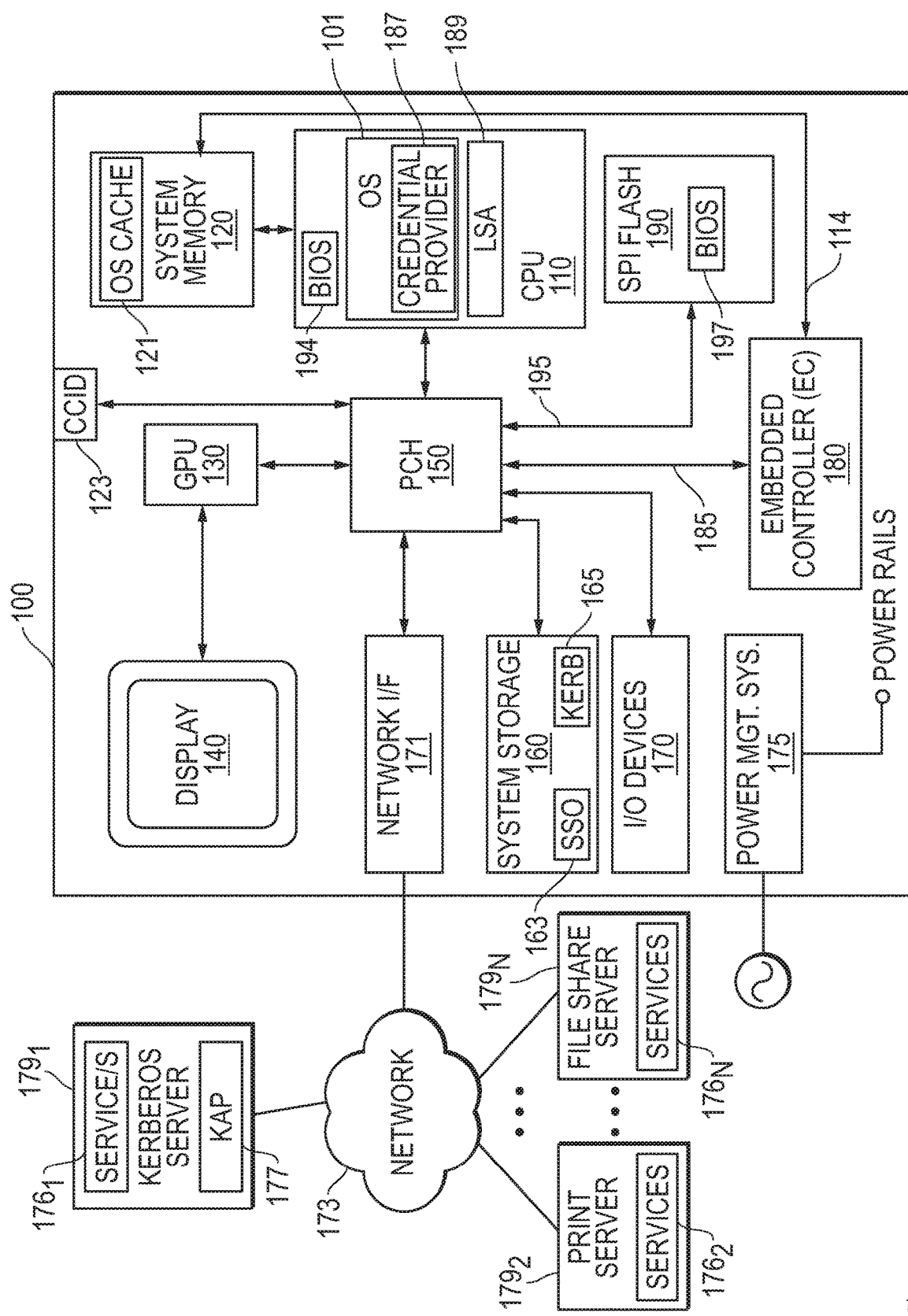
FIG. 1 is a block diagram of an information handling system and network environment according to one exemplary embodiment of the disclosed systems and methods.

FIG. 1 is a block diagram of a client information handling system 100 (e.g., a desktop computer, laptop computer, tablet computer, MP3 player, personal data assistant (PDA), cell phone, etc.) as it may be configured according to one embodiment of the present disclosure. In this regard, it should be understood that the configuration of FIG. 1 is exemplary only, and that the disclosed methods may be implemented on other types of information handling systems. It should be further understood that while certain components of an information handling system are shown in FIG. 1 for illustrating embodiments of the present disclosure, the information handling system is not restricted to including only those components shown in FIG. 1 and described below.

As shown in FIG. 1, client information handling system 100 may generally include a host processing device 110 (e.g., programmable integrated circuit such as a central processing unit (CPU)), for executing an operating system (OS) 101 (e.g., Microsoft Windows-based OS such as Windows 10, Linux OS, etc.) for system 100, as well as for executing other logic such as user software applications, etc. CPU 110 may also be configured to access BIOS code 197 from non-volatile serial peripheral interface (SPI) Flash memory 190 to load and execute it as basic input/output system (BIOS) 194 for system 100 as shown.

As described further herein, in one exemplary embodiment OS 101 includes credential provider logic 187 (e.g., implemented within a Windows OS credential/login layer) for retrieving user credentials for authentication during OS sign on, and an OS local Security Authority (LSA) layer 189 (e.g., standard LSA implemented by Windows OS) that includes generic OS application programming interfaces (APIs) and library layer that enables communication via a Local Inter-Process Communication (LPC) between credential provider layer 187 and LSA layer 189. In this regard, LSA 189 is included in the Windows OS authentication software stack as a shim which provides the necessary abstraction to upper level authentication services from the modules that handle operations related to specific authentication factor and/or protocols. LSA 189 thus provides generic APIs that can be used to communicate with these modules. One such API, LsaCallAuthenticationPackage, may be used with the message KerbSubmitTicketMessage to insert Kerberos tokens obtained in a preboot environment to be inserted into Windows OS cache. This communication between credential provider layer 187 and LSA layer 189 thus enables authentication tokens (e.g., Kerberos TGT tokens) originally obtained from authentication server (e.g., Kerberos server) $179_1$ in a pre-boot PBA environment to be inserted into the OS cache 121 on system memory 120. For example, the shim feature of LSA layer 189 may be employed to intercept API calls and change arguments and/or redirect or handle operations as needed.

CPU 110 may include any type of processing device, such as an Intel Pentium series processor, an Advanced Micro Devices (AMD) processor or another programmable integrated circuit. CPU 110 is coupled to system memory 120, which may include, for example, random access memory (RAM), dynamic RAM (DRAM), synchronous DRAM (SDRAM), and other suitable storage mediums. In some embodiments, tasks and functions of SPI Flash 190 described herein may be performed by any other suitable one or more non-volatile memory (NVM) devices, e.g., including solid state drive/s (SSDs), hard drive/s, etc.

In some embodiments, client information handling system 100 may include other types of processing devices including, but not limited to, a graphics processor unit (GPU) 130, a graphics-derivative processor (such as a physics/gaming processor), a digital signal processor (DSP), etc. Although GPU 130 is shown as a separate processing device in the embodiment of FIG. 1, GPU 130 may be omitted in other embodiments, when the functionality provided thereby is integrated with CPU 110 in a system-on-chip (SoC) design. In FIG. 1, display device 140 (e.g., LCD display or other suitable display device) is coupled to graphics processing unit (GPU) 130 to provide visual images (e.g., a graphical user interface, static images and/or video content) to the user. GPU 130 is, in turn, coupled to CPU 110 via platform controller hub 150.

Platform controller hub (PCH) 150 controls certain data paths and manages information flow between components of the client information handling system. As such, PCH 150 may include one or more integrated controllers or interfaces for controlling the data paths connecting PCH 150 with CPU 110, GPU 130, system storage 160, input/output (I/O) devices 170, network interface (I/F) device 171, embedded controller (EC) 180, SPI Flash memory device 190 where BIOS firmware image 194 is stored and external USB interface 123 (e.g., implementing Chip Card Interface Device "CCID" protocol for connecting a smart card device or other CCID to PCH 150). In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

Local non-volatile system storage 160 (e.g., one or more media drives, such as hard disk drives (HDDs), optical drives, NVRAM devices, Flash memory devices, solid state drives (SSDs), or any other suitable form of internal or external non-volatile storage) is coupled to PCH 150 to provide permanent storage for client information handling system 100. I/O devices 170 (e.g., a keyboard, mouse, touchpad, touchscreen, etc.) are coupled to PCH 150 to enable to local user to interact with client information handling system 100, and to interact with application programs or other software/firmware executing thereon. A network I/F device 171 enables wired and/or wireless communication with remote network devices $179_1$ to $179_N$ via an external network 173 (e.g., the Internet or corporate intranet), and in one embodiment may include a network interface controller (NIC) communicating with network 173 across a local area network (LAN) or wireless LAN. In the embodiment of FIG. 1, "N" represents any integer number corresponding to the number of remote network devices 179 accessible by system 100 across network 173).

Illustrated examples of remote network devices 179 in FIG. 1 include an authentication server in the form of Kerberos server $179_1$ which includes at least one programmable integrated circuit executing a Kerberos authentication package (KAP) 177. Other example network devices in FIG. 1 include network service devices such as a print server $179_2$ and a file sharing server $179_N$. In one embodiment, each of network service devices $179_2$ and $179_N$ may be an information handling system that includes system memory, non-volatile storage and a programmable integrated circuit executing to provide respective network resources in the form of services 176, e.g., such as print services $176_2$ provided by print server $179_2$, and file sharing services $176_N$ provided by file share server $179_N$. In this embodiment, Kerberos authentication server $179_1$ is an information handling system that is also configured as a network service device that provides services $176_1$ (e.g., such as file sharing services, print services, computer gaming services, media streaming services, cloud data storage services, data processing services, virtual machine services, etc.), although in other embodiments an authentication server need not also be configured as a network service device that provides any network services 179 in other embodiments.

Further, any additional or alternative network service devices 179 may be present and coupled to provide additional or alternative services 176 to a client system 100 network 173, e.g., such as file sharing services, print services, computer gaming services, streaming media services, cloud data storage services, data processing services, virtual machine services, etc. Although one exemplary embodiment that utilizes a Kerberos server is described in relation to the figures herein, it will be understood that the disclosed systems and methods may be implemented with any other suitable type of authentication server that authenticates client systems across a network and provides authentication tokens and service tickets to the authenticated client systems.

A power source for the client information handling system 100 may be provided via an external power source (e.g., mains power) and an internal power supply regulator, and/or by an internal power source, such as a battery. As shown in FIG. 1, power management system 175 may be included within client information handling system 100 for moderating the available power from the power source. In one embodiment, power management system 175 may be coupled to provide operating voltages on one or more power rails to one or more components of the client information handling system 100, as well as to perform other power-related administrative tasks of the client information handling system. For example, power management system 175 may be coupled to provide an operating voltage on a primary power rail to PCH 150, and may be further coupled to provide an operating voltage (e.g., 3.3V) on another power rail to EC 180. In addition to the power rails explicitly shown in FIG. 1, it is noted that power management system 175 may be coupled to provide additional operating voltages on one or more additional power rails to PCH 150, EC 180 and other components of client information handling system 100.

Embedded controller (EC) 180 is coupled to PCH 150 and may be configured to perform functions such as power/thermal system management, etc. EC 180 may also be configured to execute program instructions to boot client information handling system 100, load application firmware from SPI Flash memory device 190 into internal memory, launch the application firmware, etc. In one example, EC 180 may include a processing device for executing program instructions to perform the above stated functions. Although not strictly limited to such, processing device of EC 180 may be implemented as a programmable integrated circuit (e.g., a controller, microcontroller, microprocessor, ASIC, etc., or as a programmable logic device "PLD" such as FPGA, complex programmable logic device "CPLD", etc.).

As shown in FIG. 1, EC 180 is coupled to PCH 150 via data bus 185, and SPI Flash memory device 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, SPI Flash memory device 190 is a shared Flash memory device, which is connected to PCH 150 and EC 180. In such a configuration, PCH 150 provides EC 180 shared access to SPI Flash memory device 190 via eSPI bus 185, SPI bus 195 and various interface and logic blocks included within the PCH.

Figure 2:
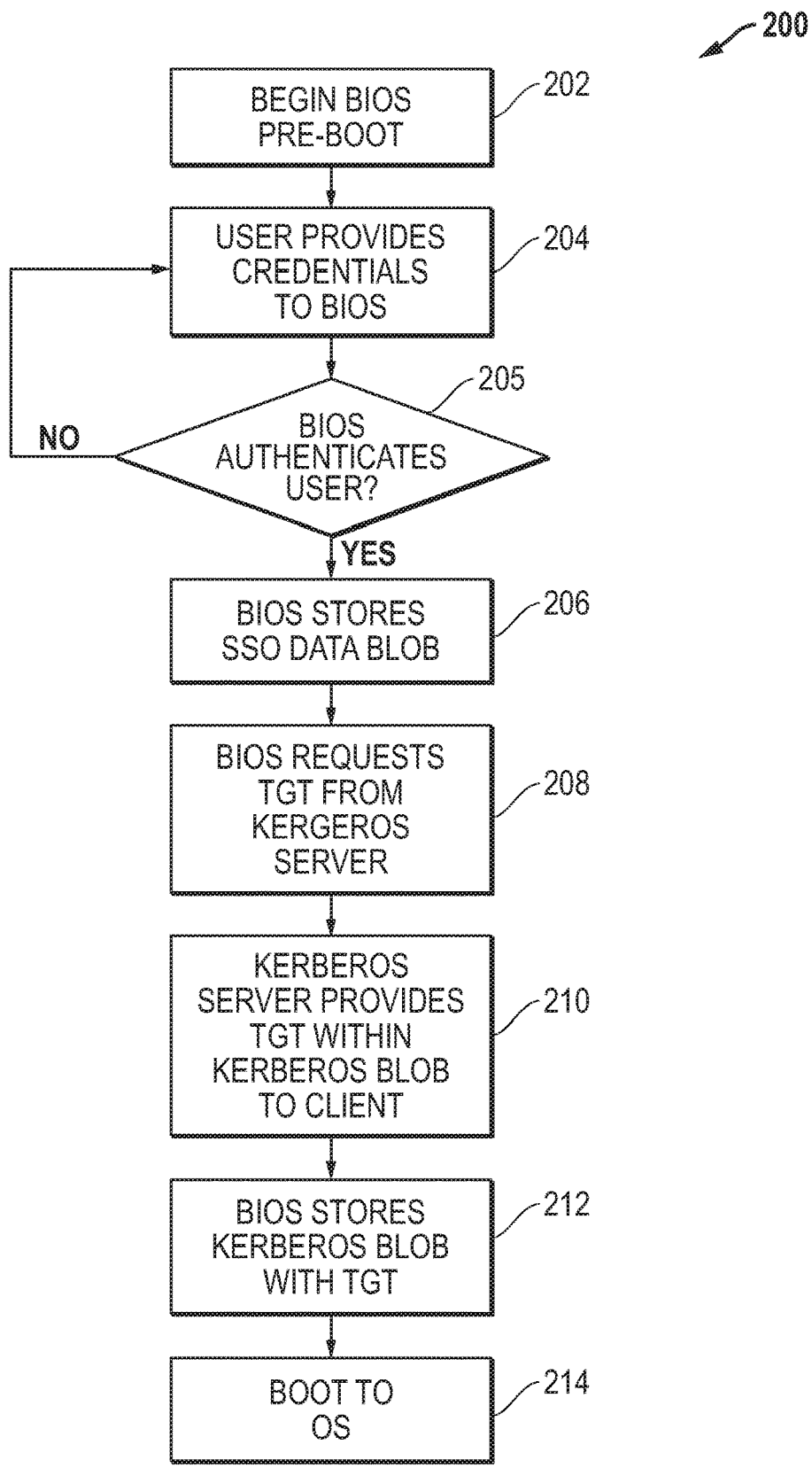
FIG. 2 illustrates methodology according to one exemplary embodiment of the disclosed systems and methods.

FIG. 2 illustrates one exemplary embodiment of a methodology 200 that may be implemented for single sign on pre-boot authentication and OS provisioning of Kerberos token for a client system 100. As shown, BIOS pre-boot begins in step 202 and then proceeds to step 204 where a local system user presents their credentials (e.g., by entering password, fingerprint, facial recognition via I/O devices 170 or inserting smart card into USB interface 123) to BIOS 194 executing on host processing device 110 of client system 100. In step 205, BIOS 194 determines whether to authenticate the current user based on comparison of the presented user credentials to pre-designated authentication information, e.g., that may be stored on system storage 160 or SPI flash 190. If BIOS 194 determines in step 205 that the presented user credentials are not valid, then methodology 200 repeats to step 204 without user authentication, and to allow a user to again provide credentials for authentication.

In the case that BIOS 194 determines in step 206 that the presented user credentials are valid, then BIOS 194 authenticates the user credentials. BIOS 194 then stores a SSO data blob 163, e.g., as encrypted data on system storage 160 and/or in a secure area of system storage 160 where such exists. SSO data blob 163 includes data for later use by the OS 101, including data (e.g., flags or other data structure) that evidences to OS 101 that successful completion of user authentication and sign-on has previously occurred in step 205 of system pre-boot. In this regard, OS 101 only allows post-boot sign on without user re-authentication if it finds a valid SSO data blob 163 existing on system storage 160. In one embodiment, a SSO key may also be generated and stored in step 206 as part of SSO data blob 163, e.g., generated using standard encryption methods which both the PBA and the OS credential provider service of logic 187 are able to derive and utilize. Such a SSO key may be later used by OS 101 to assure that the correct user has been authenticated by BIOS 194 during pre-boot, and to confirm that the stored SSO data blob 163 belongs to the current identified system user. The SSO key may be so used to ensure that SSO data blob 163 has not been placed by an unauthorized party other than the current system user. BIOS 194 may also set a SSO flag or other SSO indicator in system storage 160 to show credential provider logic 187 of OS 101 that a SSO data blob 163 is present on system storage 165.

Next, in step 208, BIOS 194 communicates a request for network access and/or one or more service/s across network 173 (e.g., corporate network or corporate intranet) to Kerberos server 179$_1$ from client system 100. This request for service/s may be a data blob including current user identification (e.g., user name or other user identification information) to identify the current user. In step 210, KAP 177 executing on Kerberos server 179$_1$ may verify that the current user is authorized for accessing the requested service/s on network 173 by checking the provided current user identity versus a user identification database (e.g., directory). If the current user identity is contained in the database, then KAP 177 on the Kerberos server 179$_1$ generates a TGT or other suitable current token that identifies the authorized service/s for client system 100. This current TGT is timestamped and provided as part of a Kerberos data blob 165 (e.g., which includes any other additional relevant Kerberos data such as network resource permissions for the current user) across network 173 to client system 100, where the token is stored by BIOS 194 on system storage 160 in step 212. BIOS 194 then boots to the OS in step 214, which continues in step 302 of FIG. 3.

It will be understood that additional user authentication steps may be optionally performed in step 210 by KAP 177 of Kerberos server 179$_1$. For example, the user identity may be checked against a key distribution center (KDC) database and the TGT may be encrypted with a user private key (e.g., password) from the KDC database, in which case BIOS 194 must also know the user private key to decrypt and store the token of the Kerberos data blob 165. In another example, BIOS 194 may use the user private key to encrypt the original request sent across network 173 to Kerberos server 179$_1$. In such an embodiment, KAP 177 may use the user private key from the KDC database to successfully decrypt the original request data blob sent from client system 100, which serves to verify the identity of the current user on client system 100.

Figure 3:
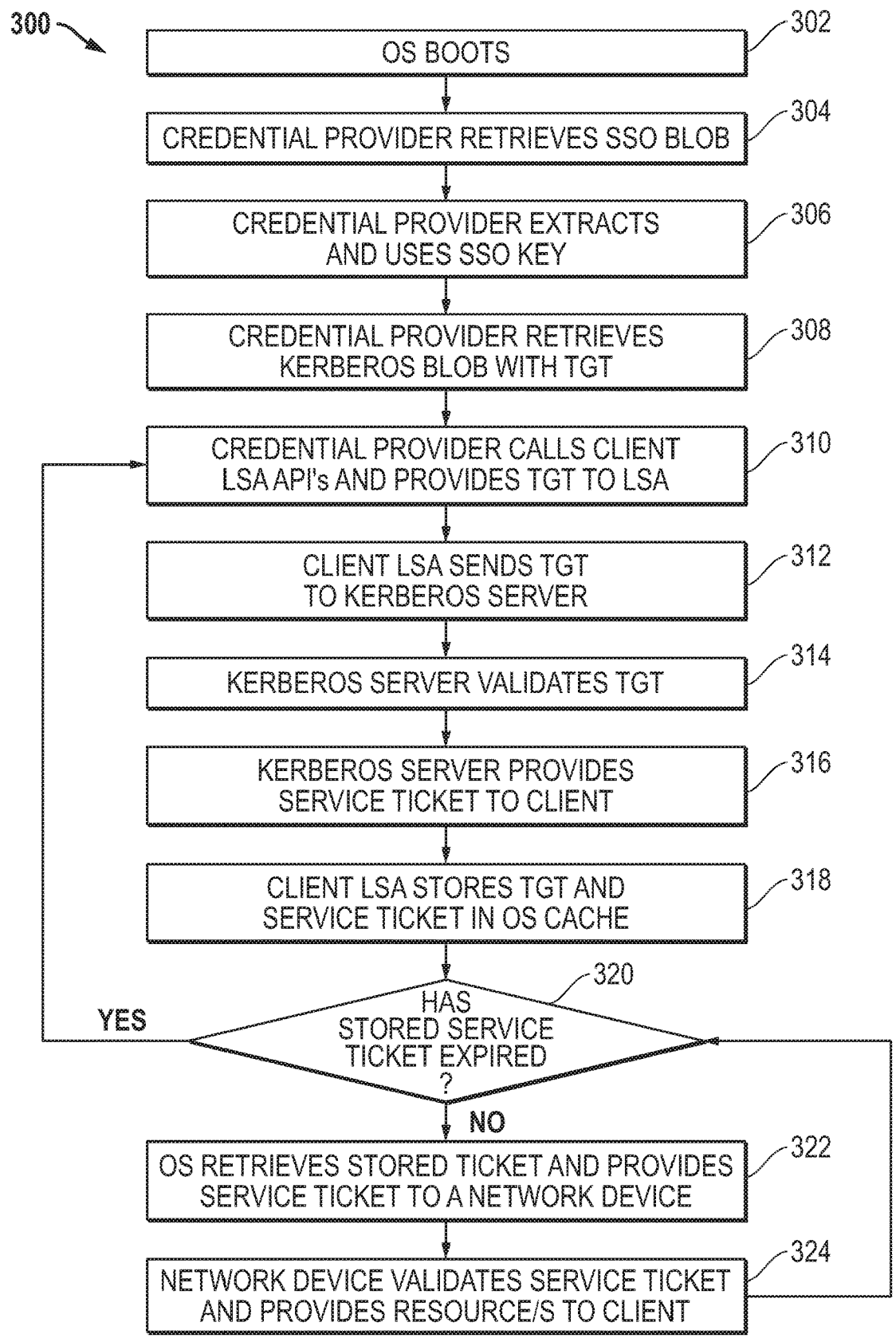
FIG. 3 illustrates methodology according to one exemplary embodiment of the disclosed systems and methods.
Figure 4:
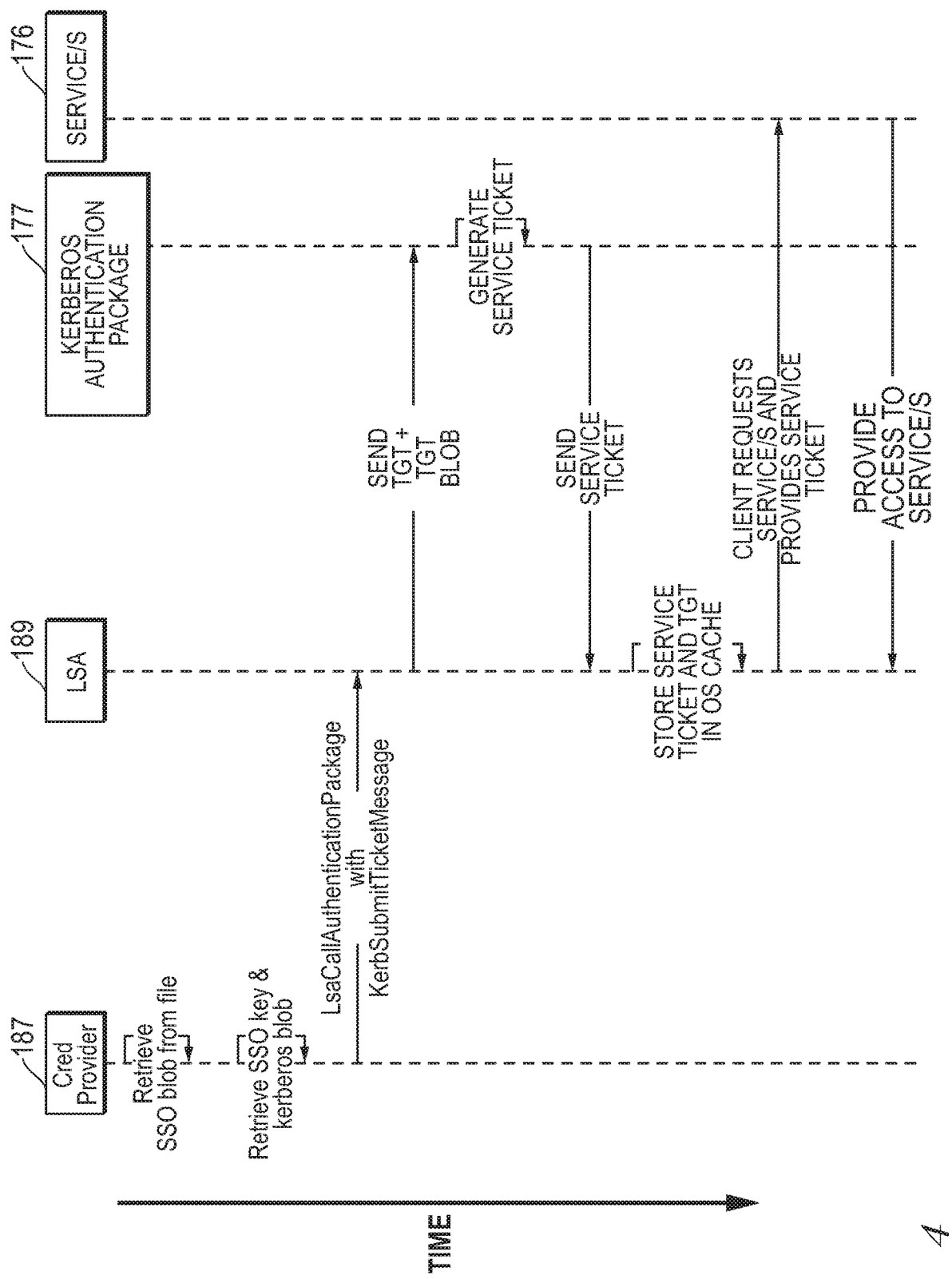
FIG. 4 illustrates methodology according to one exemplary embodiment of the disclosed systems and methods.

FIGS. 3 and 4 illustrate one exemplary embodiment of a methodology 300 and data flow 400 that may be implemented after completion of pre-boot methodology 200 of FIG. 2. In particular, methodology 300 and data flow 400 may be implemented in one embodiment for OS provisioning and use of the Kerberos token obtained during pre-boot environment and PBA of FIG. 2.

As shown, OS 101 boots up in step 302 of FIG. 3, e.g., from step 214 of FIG. 2. Credential provider logic 187 sees the previously-stored SSO indicator on system storage 160, and responds to its presence by retrieving the SSO data blob 163 from system storage 160 in step 304. Credential provider logic 187 may then extract the SSO key from the SSO data blob 163 in step 306, and may also verify that this extracted SSO key in step 306 matches a separately derived key value of credential provider logic 187 to confirm that the correct current user has been authenticated by BIOS 194, and to confirm that the stored SSO data blob 163 belongs to the current identified system user and has not been placed by a different and unauthorized party. As further described herein, methodology 300 may be implemented in one embodiment to accomplish OS boot and user access to network service/s 176 without requiring the user to enter any password or other credential during OS booting and post-boot operating environment.

In step 308, credential provider logic 187 retrieves the previously-stored Kerberos data blob 165 with its current TGT from system storage 160. Then in step 310, credential provider logic 187 requests a ticket for the requested service/s 176 by calling client LSA API LsaCallAuthenticationPackage with the message KerbSubmitTicketMessage, and provides the current TGT to LSA 189. LSA 189 responds to this API call in step 312 by sending the current TGT and an associated TGT data blob across network 173 to Kerberos server 179$_1$. The TGT data blob may include data specifying permissions for the current user, e.g., such as what service/s 176 are allowed for the current user. These allowed service/s 176 may correspond to only those service/s 176 provided by one of network service devices 179, or may correspond to service/s provided by two or more different network service devices 179.

Kerberos authentication package (KAP) 177 executing on Kerberos server 179$_1$ then authenticates the current TGT for the requested service/s 176 in step 314 (as allowed for the permissions specified by the TGT data blob). This TGT authentication may be performed, for example, by a KDC server. Once the current TGT is authorized for the requested service/s, Kerberos server 179$_1$ generates and transmits a timestamped service ticket in step 316 across network 173 to client system 100 for its future use. This service ticket allows client system 100 to access the requested (and allowed) service/s 176 across network 173, which may include service/s 176 for only one of network service devices 179 or which may include service/s 176 for more than one of network service devices 179. The service ticket may be optionally configured by the Kerberos server 179₁ as a temporary service ticket that includes an expiration time, i.e., such that the temporary service ticket expires after a specified time period (e.g., from 1 to 10 hours or other suitable greater or lesser time period). In step 318, the current TGT and service ticket are stored in OS cache 121 by LSA 189

Still referring to FIGS. 3 and 4, methodology 300 may proceed to steps 322 and 324 (described further below) as long as any specified time limit for the service ticket has not expired in step 320. However, if the service ticket time limit has expired in step 320, then methodology 300 repeats to step 310 so that a new service ticket must be requested for the desired service/s.

When client system 100 desires to access service/s 176 on a given network service device 179, LSA 189 retrieves the stored service ticket from OS cache 121 and provides this service ticket in step 322 across network 173 to the given network service device 179. In the embodiment of FIG. 1, the given network service device may be any one of network service devices 179₁ to 179_N, depending on the corresponding particular service/s 176₁ to 176_N authorized for client system 100 by the current service ticket and currently desired by client system 100 Then in step 324, the given network service device 179 validates this service ticket and provides those service/s authorized by the service ticket across network 100 to client system 100. This process may be repeated as long as the current service ticket in OS cache 121 has not expired in step 320, after which methodology 300 repeats to step 310 as previously described.

It will be understood that the steps of FIGS. 3 and 4 are exemplary only, and that any combination of fewer, additional and/or alternative steps may be employed that are suitable for authenticating a user in a pre-boot environment using the basic input/output system (BIOS) of an client information handling system, and to securely provision a resulting authentication token to post-boot operating system (OS) login components of the same system, so as to allow the user to gain access to network resources on other network service devices. Further, although described in relation to the embodiment of system 100 of FIG. 1, it will be understood that the disclosed methods of FIGS. 3 and 4 may be implemented on other configurations of client information handling system components, e.g., that include fewer, additional and/or alternative system components to that shown and described in relation to FIG. 1.

It will also be understood that one or more of the tasks, functions, or methodologies described herein (e.g., including those described herein for components 110, 120, 130, 160, 171, 179, 180, 190, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:
1. A method, comprising:
  executing a basic input/output system (BIOS) on a client information handling system in a pre-boot environment before any operating system (OS) is booted to:
    receive presented user credentials from a current local user of the client information handling system, then use the presented user credential to determine whether to authenticate the current local user of the client information handling system, then, only if it is determined by the BIOS to authenticate the current local user, store sign-on data evidencing successful authentication of the current local user by the BIOS in a local system storage and transmit a request for network access and/or services for the current local user across a network to a first remote network device, and then receive and store an authentication token received across the network in the client information handling system from the first remote network device in response to the request for network access and/or services; and then booting an OS on the client information handling system to a post-boot operating environment without requiring the current local user to enter any credentials during the OS booting or the post-boot operating environment, and executing the booted OS to:

retrieve the stored sign-on data from the local system storage, then attempt to verify that the stored sign-on data retrieved from the local system storage corresponds to data previously stored by the BIOS evidencing successful authentication of the current local user by the BIOS, then, only if it is determined by the OS to verify the retrieved stored sign-on data, allow post-boot sign-on to the OS and retrieve and provide the stored authentication token across the network from the client information handling system to at least one network service device to obtain access to one or more services of the network service device.

2. The method of claim 1, where the first network device comprises an authentication server, and where the method further comprises operating the client information handling system in the pre-boot environment to execute the BIOS on the client information handling system to:

transmit a request for service/s across the network to the authentication server only if the current local user is authenticated on the client information handling system by the BIOS; and then receive the authentication token from the authentication server in response to the request for service/s, and store the received authentication token on non-volatile system storage of the client information handling system.

3. The method of claim 2, where the request for service/s comprises local user identification information for the current local user; and where the method further comprises:

checking the provided local user identification information versus a user identification database on the authentication server to verify that the current local user is included in the identification database as being authorized to access the requested one or more service/s; and then providing the authentication token across the network from the authentication server to the client information handling system only if the current local user is determined to be included in the identification database as being authorized to access the requested one or more service/s.

4. The method of claim 2, where the booting the OS on the client information handling system to a post-boot operating environment further comprises using the booted OS to perform the following without re-authenticating the current local user on the client information handling system:

retrieving the stored authentication token from the non-volatile system storage and providing the retrieved authentication token across the network from the client information handling system to the same or a different authentication server;

receiving a service ticket from the same or the different authentication server to access one or more services of the network service device without re-authenticating the current local user; and storing the received service ticket in OS cache memory on the client information handling system.

5. The method of claim 4, further comprising authenticating the provided authentication token from the client information handling system on the same or the different authentication server; and only providing the service ticket from the same or the different authentication server to the client information handling system if the provided authentication token is successfully authenticated.

6. The method of claim 4, where the first remote network device is a Kerberos authentication server; where the authentication token is a Kerberos ticket-granting ticket (TGT); and where the service ticket is a temporary service ticket that includes an expiration time.

7. The method of claim 4, where the booting the OS on the client information handling system to a post-boot operating environment further comprises using the booted OS to perform the following without re-authenticating the current local user on the client information handling system:

retrieving the service ticket from the OS cache memory on the client information handling system;

providing the retrieved service ticket across the network to the network service device; and obtaining access to the one or more services from the network service device in response to the service ticket provided to the network service device.

8. The method of claim 1, where the one or more services of the network service device comprise at least one of print services, file-sharing services, media-streaming services, cloud storage services, data processing services, virtual machine services, or computer gaming services.

9. The method of claim 1, where the first remote network device is a Kerberos authentication server; and where the authentication token is a Kerberos ticket-granting ticket (TGT).

10. The method of claim 1, where the network comprises the Internet or a corporate intranet.

11. The method of claim 1, where the sign-on data stored by the BIOS comprises a key evidencing successful authentication of the current local user by the BIOS; and where the method further comprises executing the booted OS to verify the retrieved stored sign-on data with the key.

12. An information handling system, comprising:

at least one programmable integrated circuit; and non-volatile system storage coupled to the programmable integrated circuit, the system storage comprising one or more non-volatile storage devices;

where the programmable integrated circuit is programmed to execute a basic input/output system (BIOS) in a pre-boot environment before any operating system (OS) is booted to:

receive presented user credentials from a current local user of the client information handling system, then use the presented user credential to determine whether to authenticate the current local user of the information handling system across a network with a first remote network device, then, only if it is determined by the BIOS to authenticate the current local user, store sign-on data evidencing successful authentication of the current local user by the BIOS in a local system storage and transmit a request for network access and/or services for the current local user across a network to a first remote network device, and then receive and store in the system storage an authentication token received across the network in the information handling system from the first remote network device in response to the request for network access and/or services; and where the programmable integrated circuit is programmed to then boot an OS on the information handling system to a post-boot operating environment without requiring the current local user to enter any credentials during the OS booting or the post-boot operating environment, and executing the booted OS to:

retrieve the stored sign-on data from the local system storage, then attempt to verify that the stored sign-on data retrieved from the local system storage corresponds to data previously stored by the BIOS evidencing successful authentication of the current local user by the BIOS, then, only if it is determined by the OS to verify the retrieved stored sign-on data, allow post-boot sign-on to the OS and retrieve and provide the stored authentication token across the network from the information handling system to at least one network service device to obtain access to one or more services of the network service device.

13. The information handling system of claim 12, where the first network device comprises an authentication server, and where the programmable integrated circuit is programmed to operate in the pre-boot environment to execute the BIOS to:

then transmit a request for service/s across the network to the authentication server only if the current local user is authenticated on the information handling system by the BIOS; and then receive the authentication token from the authentication server in response to the request for service/s and store the received authentication token on non-volatile system storage of the information handling system.

14. The information handling system of claim 13, where the request for service/s comprises local user identification information for the current local user.

15. The information handling system of claim 13, where the programmable integrated circuit is programmed to then boot the OS to a post-boot operating environment and use the booted OS to perform the following without re-authenticating the current local user on the information handling system:

retrieve the stored authentication token from the non-volatile system storage and provide the retrieved authentication token across the network from the information handling system to the same or a different authentication server;

receive a service ticket from the same or the different authentication server to access one or more services of the network service device without re-authenticating the current local user; and store the received service ticket in OS cache memory on the information handling system.

16. The information handling system of claim 15, further comprising non-volatile memory and one or more input/output (I/O) devices coupled to the programmable integrated circuit; and where the programmable integrated circuit is programmed to receive the user credentials provided to the BIOS by the current local user via the I/O devices, and to store the received service ticket in the OS cache memory.

17. The information handling system of claim 15, where the first remote network device is a Kerberos authentication server; where the authentication token is a Kerberos ticket-granting ticket (TGT); and where the service ticket is a temporary service ticket that includes an expiration time.

18. The information handling system of claim 15, where the programmable integrated circuit is programmed to then use the booted OS to perform the following without re-authenticating the current local user on the information handling system:

retrieve the service ticket from the OS cache memory on the information handling system;

provide the retrieved service ticket across the network to the network service device; and obtain access to the one or more services from the network service device in response to the service ticket provided to the network service device.

19. The information handling system of claim 12, where the one or more services of the network service device comprise at least one of print services, file-sharing services, media-streaming services, cloud storage services, data processing services, virtual machine services, or computer gaming services.

20. The information handling system of claim 12, where the first remote network device is a Kerberos authentication server; and where the authentication token is a Kerberos ticket-granting ticket (TGT).

21. The information handling system of claim 12, where the network comprises the Internet or a corporate intranet.

22. The information handling system of claim 12, where the sign-on data stored by the BIOS comprises a key evidencing successful authentication of the current local user by the BIOS; and where the programmable integrated circuit is programmed to execute the booted OS to verify the retrieved stored sign-on data with the key.

* * * * *